(12) United States Patent
Phelan et al.

(10) Patent No.: US 8,032,255 B2
(45) Date of Patent: Oct. 4, 2011

(54) MONITORING OF BIN LEVEL FOR AN AGRICULTURAL PRODUCT

(75) Inventors: James Joseph Phelan, Bettendorf, IA (US); Tyler Schleicher, Ankeny, IA (US)

(73) Assignee: Deere & Company, Moline, IL (US)

( * ) Notice: Subject to any disclaimer, the term of this patent is extended or adjusted under 35 U.S.C. 154(b) by 744 days.

(21) Appl. No.: 12/164,926

(22) Filed: Jun. 30, 2008

(65) Prior Publication Data

US 2009/0325658 A1    Dec. 31, 2009

(51) Int. Cl.
G05D 9/00 (2006.01)
G06F 19/00 (2006.01)
G01B 5/18 (2006.01)

(52) U.S. Cl. ............ 700/281; 701/50; 702/166

(58) Field of Classification Search ............ 700/275, 700/281; 701/50; 702/166, 174, 175
See application file for complete search history.

(56) References Cited

U.S. PATENT DOCUMENTS

| | | | |
|---|---|---|---|
| 4,523,280 A | 6/1985 | Bachman | |
| 4,972,386 A | 11/1990 | Lau | |
| 5,106,339 A | 4/1992 | Braun et al. | |
| 5,253,859 A | 10/1993 | Ricciardi | |
| 5,282,389 A | 2/1994 | Faivre et al. | |
| 5,686,671 A * | 11/1997 | Nelson et al. | 73/861.73 |
| 5,750,877 A | 5/1998 | Behnke et al. | |
| 5,837,906 A * | 11/1998 | Palmer | 73/861.73 |
| 5,863,247 A | 1/1999 | Behnke et al. | |
| 5,890,961 A | 4/1999 | Behnke et al. | |
| 5,957,773 A | 9/1999 | Olmsted et al. | |
| 6,074,298 A | 6/2000 | Majkrzak et al. | |
| 6,242,927 B1 | 6/2001 | Adams et al. | |
| 6,252,499 B1 | 6/2001 | Gerdtz et al. | |
| 6,282,967 B1 | 9/2001 | Homburg et al. | |
| 2005/0137002 A1 * | 6/2005 | Murray et al. | 460/1 |
| 2006/0046800 A1 * | 3/2006 | Kaltenheuser | 460/6 |
| 2009/0207032 A1 * | 8/2009 | Gunthorpe et al. | 340/617 |

FOREIGN PATENT DOCUMENTS

| | | |
|---|---|---|
| DE | 2458571 | 6/1976 |
| DE | 3812293 | 10/1989 |
| DE | 10051096 | 4/2002 |
| FR | 2840065 | 11/2003 |
| FR | 2840066 | 11/2003 |
| GB | 2216763 | 10/1989 |
| JP | 5057202 | 3/1993 |
| JP | 2003000047 | 1/2003 |
| JP | 20030289717 | 1/2003 |
| WO | 00/35265 | 6/2000 |

* cited by examiner

*Primary Examiner* — Ryan Jarrett

(57) ABSTRACT

A level sensor, associated with a bin, detects a particular reference level of an agricultural product in the bin and generates a calibration indicator. An input sensor determines an input rate of the agricultural product into the bin. A conveyer is capable of transporting the agricultural product out of the bin. An output sensor provides a status indicator that indicates whether the conveyer is in an active state or in an inactive state during one or more evaluation time windows. A data processor determines an output rate of the agricultural product based on the status indicator. The data processor comprises a level estimator for estimating an estimated bin level of the bin based on the input rate and an output rate. The data processor comprises a calibrator for calibrating the estimated bin level with reference to the particular reference level in response to the calibration indicator.

23 Claims, 3 Drawing Sheets

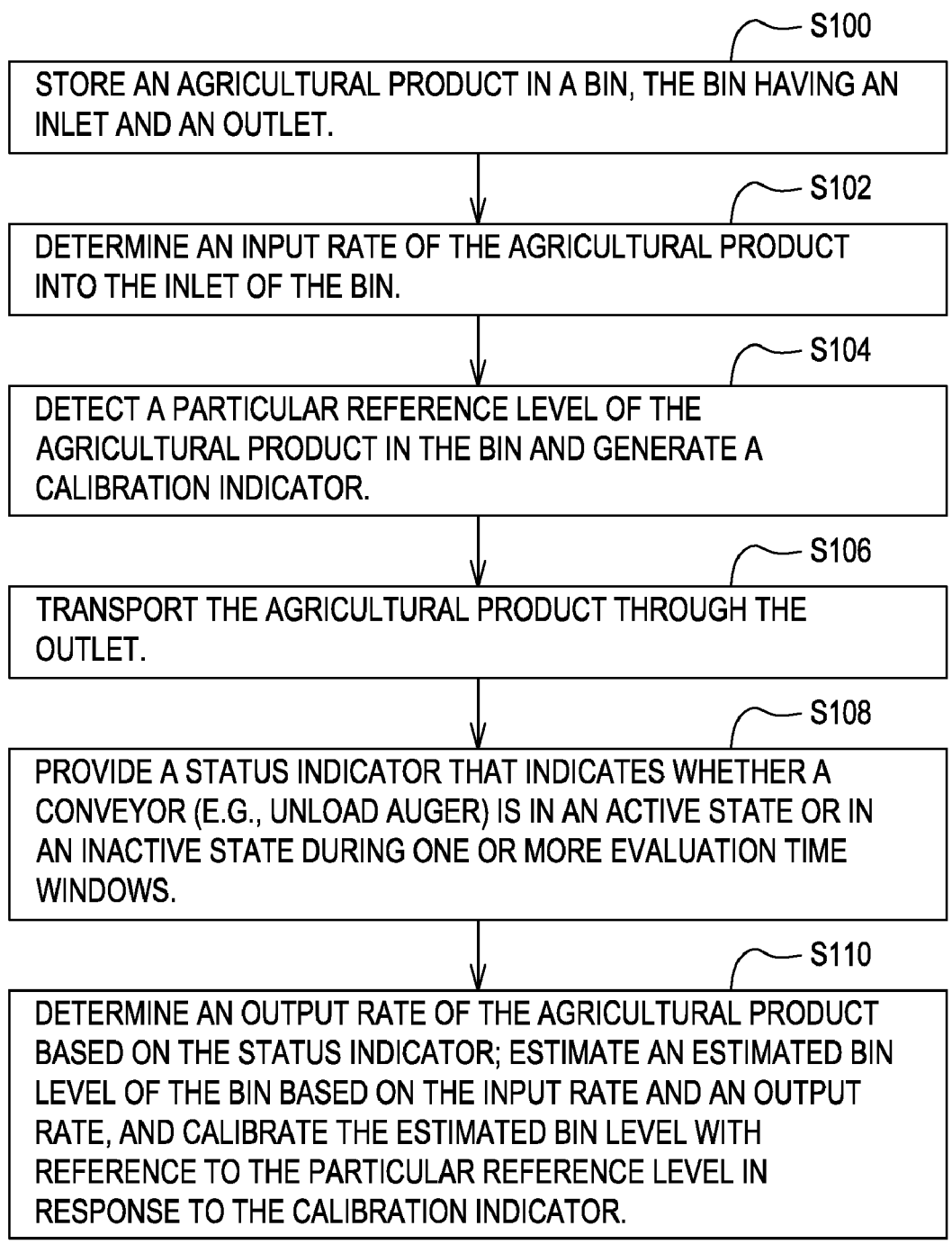

MONITORING OF BIN LEVEL FOR AN AGRICULTURAL PRODUCT

FIELD OF THE INVENTION

This invention relates to the monitoring of a bin level for an agricultural product, such as grain.

BACKGROUND OF THE INVENTION

A combine, harvester or other vehicle is associated with a bin for storing grain, oilseed or another agricultural product. Some bins may be equipped with one or more switches to monitor the level of the agricultural product in the bin. However, if the bin level is between two switches, the resolution of the bin level reading may be inadequate. In addition, a bin level detector with multiple switches may be difficult to maintain because of switch failures from dirt, debris or agricultural products. Accordingly, there is need for an improved method and system for monitoring the bin level for an agricultural product.

SUMMARY OF THE INVENTION

In accordance with one embodiment, a monitoring system for monitoring a bin level for an agricultural product comprises a bin for storing an agricultural product, where the bin has an inlet and an outlet. A level sensor, associated with the bin, detects a particular reference level of the agricultural product and generates a calibration indicator. An input sensor (e.g., mass flow sensor) is associated with the inlet to determine an input rate of the agricultural product into the inlet of the bin. A conveyer (e.g., unload auger) is capable of transporting the agricultural product our or through the outlet. An output sensor is associated with the conveyer. The output sensor provides a status indicator that indicates whether the conveyer is in an active state or in an inactive state during one or more evaluation time windows. A data processor determines an output rate of the agricultural product based on the status indicator. The data processor comprises a level estimator for estimating an estimated bin level of the bin based on the input rate and an output rate. The data processor comprises a calibrator for calibrating the estimated bin level with reference to the particular reference level in response to the calibration indicator.

BRIEF DESCRIPTION OF THE DRAWINGS

FIG. 3 is a flow chart that illustrates a method of a monitoring system for monitoring a bin level for an agricultural product.

DESCRIPTION OF THE PREFERRED EMBODIMENT

Figure 1:
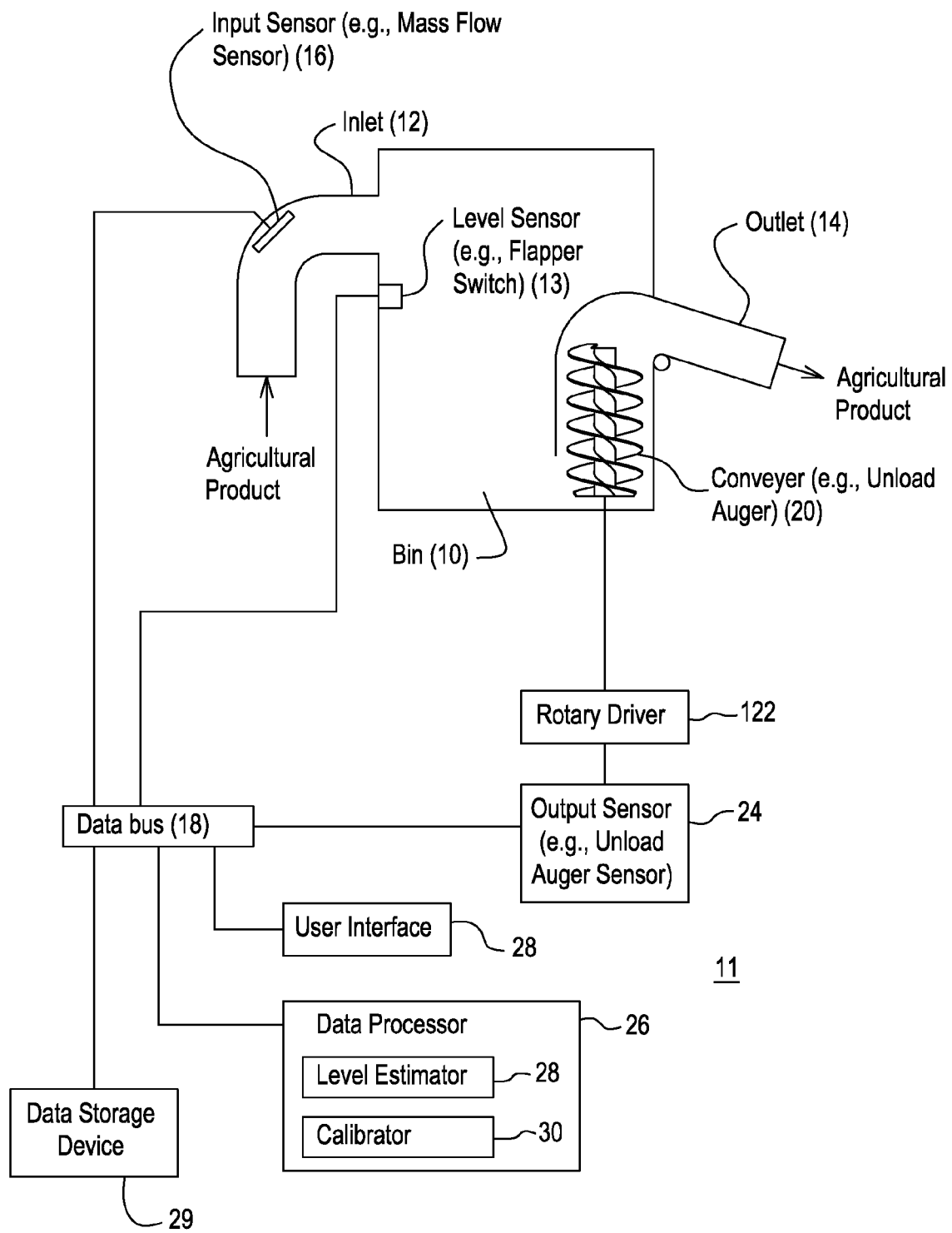
FIG. 1 is a diagram that illustrates one embodiment of a monitoring system for monitoring a bin level for an agricultural product.

In accordance with FIG. 1, one embodiment of the monitoring system 11 comprises a data processor 26 that receives sensor data or a sensor signal from one or more of the following devices: an input sensor 16 (e.g., a mass flow sensor), a level sensor 13, and an output sensor 24 (e.g., unload auger sensor). The data processor 26 can communicate with a user interface 28 or a data storage device via a data bus 18.

In one embodiment, the input sensor 16, the level sensor 13, the output sensor 24, a user interface 28, and data storage device 29 are coupled to a data bus 18. In turn, the data bus 18 is coupled to the data processor 26. The output sensor 24 may be associated with a shaft or rotor of a conveyer 20, a rotary driver 122, or an electric motor 22 (in FIG. 2). In one embodiment, the data processor 26 comprises a level estimator 28 and a calibrator 30. The data processor may provide output data, bin level data or an output signal to the user interface 28.

As shown in FIG. 1, the monitoring system 11 comprises a bin 10, where the bin 10 has an inlet 12 and an outlet 14. The bin 10 may comprise any container, vessel or storage volume for storing the agricultural product. An input sensor 16 (e.g., a mass flow sensor) is associated with the inlet 12. The input sensor 16 is associated with the inlet 12 to determine an input rate of the agricultural product into the inlet 12 of the bin 10.

In one embodiment, the input sensor 16 may comprise a piezoelectric or piezoresistive member associated with an impact plate. As grain or the agricultural product traveling through the inlet 12 strikes the impact plate, the impact plate is deflected, moved or exposed to a force that compresses or otherwise interacts with the piezoelectric or piezoresistive material. A piezoelectric maternal is a material that changes an electrical property in response to the application of force (e.g., compressive force). A piezoresistive material is a material that changes its resistance in response to the application of a force (e.g., compressive force).

In an alternate embodiment, the input sensor 16 may comprise a radiometric flow sensor, a microwave flow sensor, or any other suitable device for determining or estimating the flow rate, volume per unit time, mass per unit time of the agricultural material entering the bin 10 or traveling through the inlet 12 into the bin 10. For example, the input sensor 16 may provide an input rate of the agricultural product that is measured in kilograms per second, pounds per second, or bushels per second.

The level sensor 13 or level detector is associated with an interior of the bin 10. The level sensor 13 may comprise a flapper switch, a switch attached to a movable or rotatable arm that is activated by the weight or pressure from the agricultural product within the bin 10. For example, the level sensor 13 may comprise a switch that is activated or deactivated by a movable arm that is biased by a resilient member (e.g., a spring or elastomer). Although the level sensor 13 may be located at virtually any known bin level, in one embodiment, the level sensor 13 is located at an intermediate bin level (e.g., approximately half full or half empty) between an empty bin level and a full bin level.

In an alternate embodiment, the level sensor 13 may comprise a transceiver that transmits a electromagnetic signal (e.g., a pulse) toward a reflective surface inside the bin 10 and a receiver that is capable of receiving a reflection (e.g., a reflection of the transmitted pulse). The electromagnetic signal may comprise a near infrared frequency signal, an infrared frequency signal, a visible light frequency signal, an ultraviolet light frequency signal, a microwave frequency signal, or a signal within another suitable frequency range. If the receiver receives a reflection, the agricultural product may be regarded as absent or below the level of the transceiver and reflective surface. However, if the receiver fails to receive the reflection, the agricultural product may be regarded as present or above the level of the transceiver and the reflective surface.

A conveyer 20 (e.g., an unload auger) is associated with the outlet 14 of the bin 10. The conveyer 20 is capable of transporting the agricultural product through the outlet 14. In one embodiment, the conveyer 20 comprises an unload auger.

As illustrated in FIG. 1, a rotary driver 122 drives the conveyer 20 (e.g., unload auger) such that the conveyer moves or transports the agricultural product from the bin 10 to or through the outlet 14. The rotary driver 122 has a shaft. The output sensor 24 detects a rotational velocity of the shaft or a rotor of the rotary driver 122.

In one embodiment, the rotary driver 122 comprises a pulley, wheel, a gear, or rotor that receives rotational motion from a shaft of an internal combustion engine or another rotary propulsion device. Although the rotational velocity or speed of the conveyer 20 (e.g., unload auger) may vary with the speed of the internal combustion engine or other rotary propulsion device, the rotary driver 122 may be limited to a certain rotational velocity range bounded by a lower rotational velocity and an upper rotational velocity.

In an alternate embodiment, the conveyer 20 may comprise a belt, chain or linkage assembly that rotates between two pulleys, gears or wheels, where a series of interspaced carriers (e.g., scoops) are attached to the rotating device and are able to scoop up, move and dump (or otherwise transport) the agricultural product.

Figure 2:
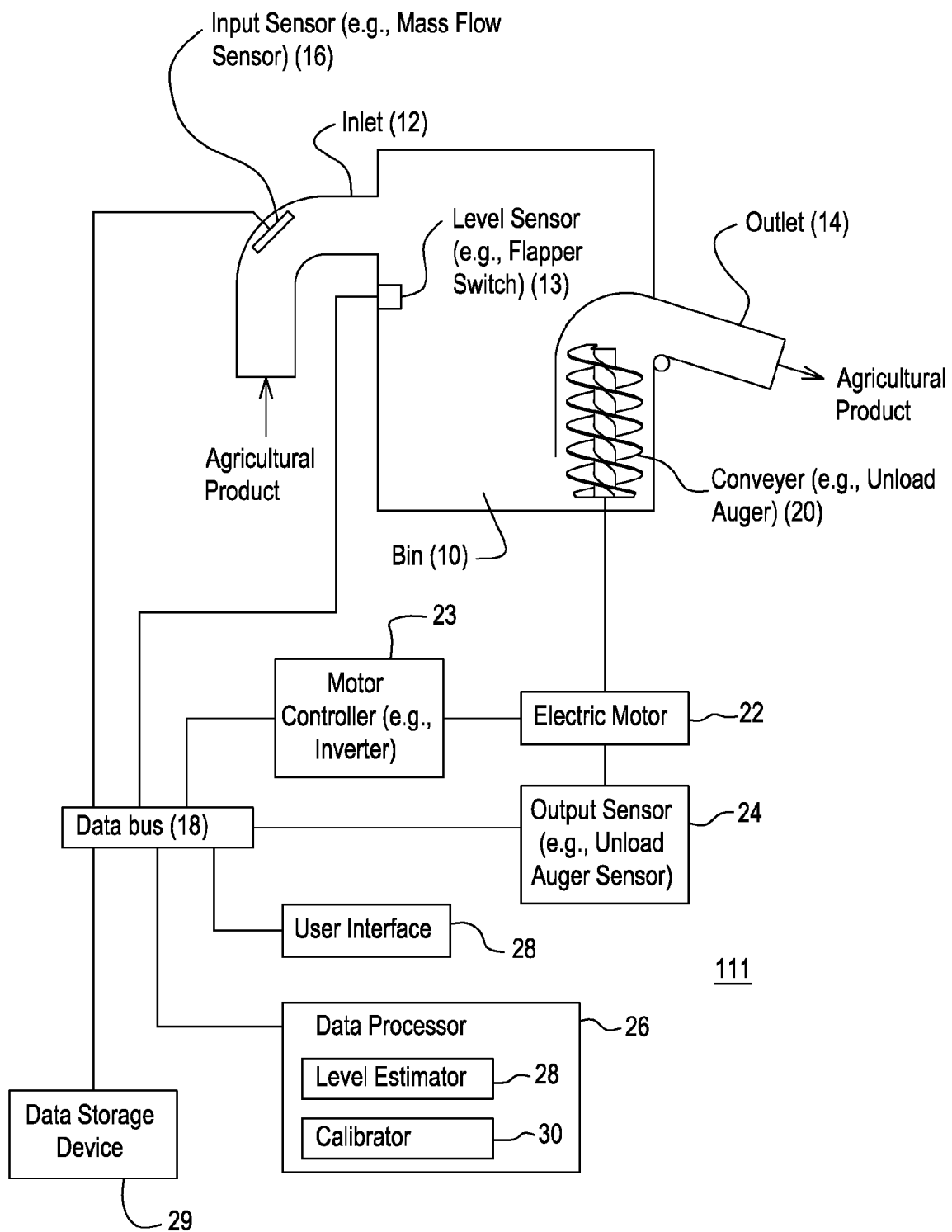
FIG. 2 is a diagram that illustrates one embodiment of a monitoring system for monitoring a bin level for an agricultural product.

An output sensor 24 is associated with one or more of the following: the shaft or rotor of the conveyer 20 (e.g., unload auger), the shaft or rotor of the rotary driver 122, or the shaft or rotor of an electric motor 22 (in FIG. 2). In one embodiment, the output sensor 24 comprises an unload auger sensor. In another embodiment, the output sensor 24 comprises a magnetoresistive sensor, a Hall Effect sensor, or another magnetic field sensor and a timer for determining the rotational velocity of a shaft or rotor, where the shaft or rotor is associated with a magnet (e.g., permanent magnet). However, in an alternate embodiment the rotational velocity may be measured by a mechanical sensor that is rotationally coupled (e.g., via a gear or belt) to the shaft or the rotor.

The output sensor 24 provides a status indicator that indicates one or more of the following: (a) whether the unload auger is in an active state or in an inactive state during one or more evaluation time windows, or (b) a rotational velocity of a shaft or rotor associated with the conveyer 20, the rotary driver 122, or the electric motor 22 (in FIG. 2). In one illustrative configuration, the output sensor 24 is arranged to measure a time duration (e.g. aggregate elapsed or cumulative time) in which a rotary driver 122 for driving the conveyer 20 is in an active state or an inactive state. In another illustrative configuration, the output sensor 24 is arranged to measure a time duration (e.g., aggregate elapsed or cumulative time) in which an electric motor 22 for driving the conveyer 20 is in an active state or inactive state. The time duration may aggregate the active state associated with discontinuous or interrupted time periods or evaluation time windows. In yet another illustrative configuration, the output sensor 24 is arranged to measure a rotational velocity of the rotary driver 122 versus time, where the rotary driver 122 is configured to drive the conveyer 20. In still another illustrative configuration, the output sensor 24 is arranged to measure a rotational velocity of the electric motor 22 versus time, where the electric motor 22 is configured to drive the conveyer 20.

The output rate (of discharged agricultural product through the outlet 14) may be proportional to the rotational velocity, mean rotational velocity, or mode rotational velocity of a rotor or shaft of the conveyer 20, rotary device 122, or electric motor 22 (in FIG. 2). The data processor 26 or level estimator 28 may estimate the output rate based on an equation or with reference to a look-up table or data stored in the data storage device 29 associated with the data processor 26. In one example, the data processor 26 determines the output rate based on the status indicator. In another example, the data processor 26 determines the output rate based on the status indicator and the rotational velocity.

In an alternate embodiment, a user may enter the output rate into the user interface 28, where the output sensor 24 is not present or does not provide appropriate data for determining the output rate of the agricultural product. The user may enter the output rate based on the specifications of the conveyer 20 (e.g., unload auger) or historic measurements of the output rate for the conveyer 20, for example.

In one embodiment, the data processor 26 comprises a level estimator 28 for estimating an estimated bin level of the bin 10 based on one or more of the following: (a) the input rate (of the agricultural product into the bin 10 via the inlet 12), (b) an output rate (of the agricultural product discharged from the bin 10 via the outlet 14), (c) the initial bin level (e.g., whether the bin level is empty or partially full with a certain volume or weight of agricultural product). The data processor 26 or the level estimator 28 estimates the output rate of agricultural product from the outlet 14 of the bin 10 based on the status indicator and the rotational velocity of the conveyer 20, for example.

The data processor 26 comprises a calibrator 30 for refining or calibrating the estimated bin level with reference to the particular reference level in response to the calibration indicator. The calibrator 30 is activated each time the actual bin level triggers the level sensor to indicate that a particular reference bin level (e.g., known bin level) is reached or has been crossed. The calibrator 30 provides an adjustment (e.g., an adjustment volume or weight) that adds or subtracts to the observed volume or weight of the agricultural product in the bin 10 to compensate for a measurement error or discrepancy in a determined bin level versus the known bin level. Accordingly, the calibrator 30 may be activated during loading (e.g., filling) or unloading (e.g., emptying) of the bin 10.

The data processor 26 or calibrator calibrates or adjusts the estimated bin level with reference to a particular reference level of the bin that is communicated via a calibration indicator. For example, if the level sensor 13 indicates that the particular reference level of the bin 10 has been reached and if the estimated bin level is different than the particular reference level of the bin 10, the data processor 26 or calibrator 30 may adjust the estimated to bin level by an adjustment volume to approximately equal the particular reference level. If the estimated bin level is less than the particular reference level of the bin, the data processor 26 or calibrator 30 adds an adjustment volume to compensate for the discrepancy. However, if the estimated bin level is greater than a particular reference level of the bin, the data processor 26 or calibrator 30 subtracts an adjustment volume to compensate for the discrepancy.

The user interface 28 may comprise a display, a keyboard, a keypad, a switch, a console, a pointing device (e.g., an electronic mouse or trackball) an audible alarm, a buzzer, gauge, light emitting diode (LED), a light bulb, or other indicator). The data processor 26 may transmit or send bin level data or a bin level signal to the user interface 28 at regular intervals, periodic intervals or on a continuous basis. Accordingly, the user or operator is continuously informed of the bin level and can efficiently plan unloading of the bin 10. The advanced notice and planning of when the bill will be full or when it is full, allows the user or operator to coordinate operation of the vehicle (e.g., combine) carrying the bin 10 with other vehicles, containers, receptacles or storage volumes (e.g., grain carts, trailers or trucks) for receiving the load of agricultural product within the bin.

The monitoring system 111 of FIG. 2 is similar to that of FIG. 1, except the monitoring system 111 of FIG. 2 replaces the rotary driver 122 of FIG. 1 with an electric motor 22 and a motor controller 23. The motor controller 23 is coupled to the electric motor 22.

In one embodiment, the electric motor 22 for drives a shaft or rotor of the conveyer 20 to move or transport an agricultural product from an interior of the bin 10 for discharge of the agricultural product through or to an outlet 14. The output sensor 24 detects a rotational velocity of the shaft or the electric motor 22. The data processor 26 determines the output rate of the agricultural product discharged from the outlet 14 based on the status indicator and the rotational velocity.

The motor controller 23 may comprise an inverter, a chopper, a signal generator, a direct current source, an alternating current source, a direct voltage source, an alternating voltage source, a voltage regulator or a current regulator for controlling a rotational velocity or direction of a shaft for driving the conveyer (e.g. unload auger). The motor controller 23 may control the rotational velocity of the electric motor independently of any revolution per unit time (e.g., revolutions per minute) of an internal combustion engine that propels the vehicle. In one embodiment, the rotational velocity of the electric motor 22 may be fixed to one or more known discrete rotational velocities. In one example, the unload auger sensor may merely detect whether the electric motor is active or inactive to estimate the unload rate of the agricultural product, if the electric motor operates a single rotational velocity. In another example, the unload auger sensor may detect whether the electric motor is active or inactive to estimate the unload rate along with the discrete rotational velocity of the electric motor, if the electric motor operates at multiple rotational speeds.

In one embodiment, an internal combustion engine is arranged for propelling a vehicle (e.g., combine or harvester) that carries the bin 10. The electric motor 22 for driving the conveyer 20 (e.g., unload auger) drives it at a rotational velocity independent of a rotational velocity of an output shaft or crankshaft of internal combustion engine. The motor controller 23 may be instructed via the user interface 28 or data processor 26 to select a rotational velocity for the conveyer 20 to achieve a certain output rate, unload rate, or discharge rate of the agricultural material, for example. Advantageously, the output rate may be kept uniform or at a target rate by the electric motor 22 and controller 23 despite fluctuations in load upon the internal combustion engine. Load fluctuations may be experienced by the internal combustion engine of the vehicle (e.g., combine or harvester) because of hilly terrain, local regions of high yield of crop or the agricultural product, damp or moisture laden areas of crop or agricultural product, among other possibilities.

FIG. 3 is method for monitoring the flow an agricultural product (e.g., grain, corn, soybeans, or oilseed). The method of FIG. 3 begins in step S100.

In step S100, an agricultural product (e.g., grain, corn, soybeans, wheat, oat or oilseeds) is stored in a bin 10, where the bin 10 has an inlet 12 and an outlet 14. The bin 10 may be carried by a vehicle such as a combine or harvester, for example. The vehicle may be propelled by an internal combustion engine that propels ground engaging wheels or tracks.

In step S102, an input sensor 16 (e.g., mass flow sensor) determines an input rate of the agricultural product into the inlet 12 of the bin 10. As the agricultural product enters the bin through the inlet 12, the bin level of the agricultural product may be increased, subject to any offset from the output rate of the agricultural product from the outlet of the bin 10. For example, the output rate may be zero where vehicle, harvester or combine is harvesting the agricultural product in field and where the bin 10 is not in an unloading mode.

In step S104, a level sensor 13 detects a particular reference level of the agricultural product in the bin 10 and generates a calibration indicator. Step S104 may be carried out in accordance with various techniques that may be applied individually or cumulatively. Under a first technique, the particular reference level may be at a partially full or known bin level associated with a known volume or weight of the agricultural product. Under a second technique, the level sensor 13 is mounted at an intermediate position (e.g., approximately half full or half empty) between full bin level (e.g., bin top) and an empty bin level (e.g., bin bottom) of the bin 10. Under a third technique, the calibrator adjusts the bin level each time upon a triggering of the level detector associated with a known bin level of the bin 10. Under a fourth technique, the level sensor (e.g., switch) is activated or deactivated by a movable arm that is biased by a resilient member against the weight or mass of the agricultural product. Accordingly, when the agricultural product reaches or exceeds the level of the movable arm, the weight or pressure of the agricultural product overcomes the biasing force of the resilient member to trip or activate the level sensor (e.g., switch) in a first state (e.g., active), whereas when the agricultural product is lower than the level of the movable arm, the movable arm is biased by the resilient member and the level sensor is in a second state (e.g., inactive).

In step S106, a conveyer 20 (e.g., unload auger) transports the agricultural product through or out the outlet 14. The conveyer 20 transports the agricultural product through the outlet 14 to discharge it to a container or storage volume (e.g., a truck or grain cart). In one example, the conveyer 20 is operated or driven (e.g., by the electric motor 22 or the rotary driver 122) at a rotational velocity independent of the rotational velocity of an internal combustion engine for propelling the vehicle that carries the bin 10.

In step S108, the output sensor 24 providers a status indicator that indicates one or more of the following: (a) whether the conveyer 20 (e.g., unload auger) is in an active state or in an inactive state during one or more evaluation time windows, or (b) a rotational velocity associated with a shaft or rotor of a conveyer 20, the rotary driver 122, or an electric motor 22 (in FIG. 2).

Step S108 may be carried out in accordance with various procedures that may be applied separately or cumulatively. In accordance with a first procedure, the output sensor 24 is arranged to measure a time duration (e.g., cumulative elapsed time or aggregating discontinuous evaluation time windows) in which a rotary driver 122 for driving the conveyer 20 is in an active state or an inactive state. In accordance with a second procedure, the output sensor 24 is arranged to measure a time duration (e.g., cumulative elapsed time or aggregating discontinuous evaluation time windows) in which an electric motor 22 for driving the conveyer 20 is in an active state or an inactive state. In accordance with a third procedure, the output sensor 24 is arranged to measure a rotational velocity of the rotary driver 122 versus time, where the rotary driver 122 is configured to drive the conveyer 20. In accordance with a fourth procedure, the output sensor 24 is arranged to measure a rotational velocity of the electric motor 22 versus time, where the electric motor 22 is configured to drive the conveyer 20.

In step S110, the data processor 26 determines an output rate of the agricultural product based on one or more of the following: (a) the status indicator and (b) the rotational velocity (or rotational velocity versus time) of a shaft or rotor associated with the conveyer 20, electric motor 22 or rotary driver 122. Further, the data processor 26 or level estimator 28 estimates an estimated bin level of the bin 10 based on the input rate and the output rate.

In step S110, if the calibration process is triggered by data (e.g., calibration indicator) from the level detector 13, the data processor 26 or the calibrator 30 calibrates the estimated bin level with reference to the particular reference level in response to the calibration indicator. The data processor 26 or the calibrator 30 adjusts the bin level each time upon a triggering of the level detector 13 associated with a known bin level of the bin 10. The level detector 13 changes states (e.g., electrical states) based on whether or not the bin level is at or below the known bin level (e.g. intermediate bin level) associated with the level detector 13. The adjustment adds or subtracts an adjustment volume to the determined or estimated bin level to compensate for a measurement error or discrepancy in a determined bin level versus a known bin level capable of being indicated by the level sensor 13.

If the bin 10 is associated with a combine, harvester or other agricultural equipment for harvesting an agricultural product, the input rate of agricultural product may vary with the yield of the harvested agricultural product or crop. The conveyer 20 (e.g., unload auger) may be inactive or deactivated until the bin 10 reaches a certain threshold level (e.g., full or nearly full.) Once the bin 10 is fill or nearly fill to the certain threshold level, a grain cart or other vessel or container may be aligned to receive an output of the agricultural product from the outlet 14 via a discharge chute or otherwise. During the loading of the grain cart, truck, trailer, or other vessel or container, the conveyer 20 is generally active. The bin level may be associated with a corresponding volume, mass, weight or an indicator displayed via a user interface 28.

Under one technique for determining the bin level, data processor 26 determines the instantaneous bin level $V(t)_{Bin}$ in accordance with the following equation: $V(t)_{Bin}=V(t)_{Input}-V(t)_{Output}+V_{Adjustment}+V_{Initial}$, where $V(t)_{Input}$ depends upon the input rate, the time duration of the input, and any variation per unit time of the input rate, $V(t)_{Output}$ depends upon the output rate, the time duration of the output, and any variation per unit time in the output rate, $V_{Adjustment}$ is a positive or negative adjustment such that a known level of $V_{Bin}$ 10 is approximately equal to $V(t)_{Bin}$ determined by $V(t)_{Input}$, $V(t)_{Output}$ and a given $V_{Initial}$. $V_{Initial}$ is equal to zero where the grain bin 10 is empty.

The volume or mass of inputted agricultural product in the bin 10 may be determined by the input rate of the agricultural product integrated over the duration of the input. For example, the volume or mass of the inputted agricultural product in the bin 10 may be estimated by the input rate (e.g., mean input rate) multiplied by the duration of the input. The inputted volume or mass is added to the initial bin level of the agricultural product in the bin 10, where the initial bin level is zero for an empty bin. If the conveyer 20 or unload auger is in an active state (e.g., as indicated by the status indicator), the volume or mass of agricultural product in the bin 10 is decreased by the output rate of the agricultural product integrated over the active duration of the conveyer 20. For example, the volume or mass of the decreased agricultural product may be estimated by the output rate (e.g., the mean output rate) multiplied by the duration of the input.

The method and system for monitoring a bin level of an agricultural product is well suited for continuously monitoring the bin level or status of how full a bin is, such as a bin associated with a combine, a harvester or another vehicle. The level sensor (13) and the calibrator (30) provide a resolution and accuracy for the bin level that is not otherwise possible. For example, if an alternate embodiment of the method and system were to exclude the level sensor (13) and calibrator (30) or the calibration process with the adjustment of bin level of the agricultural product, functionality could be achieved with less resolution or precision of the monitoring of the bin level.

Having described the preferred embodiment, it will become apparent that various modifications can be made without departing from the scope of the invention as defined in the accompanying claims.

The following is claimed:

1. A monitoring system for monitoring a bin level for an agricultural product, the system comprising:
   a bin for storing an agricultural product, the bin having an inlet and an outlet;
   a level sensor associated with the bin for detecting a particular reference level of the agricultural product and generating a calibration indicator;
   an input sensor associated with the inlet to determine an input rate of the agricultural product into the inlet of the bin;
   a conveyer for transporting the agricultural product through the outlet,
   an output sensor associated with the conveyer, the output sensor providing a status indicator that indicates whether the conveyer is in an active state or in an inactive state during one or more evaluation time windows; and
   a data processor for determining an output rate of the agricultural product based on the status indicator, the data processor comprising a level estimator for estimating an estimated bin level of the bin based on the input rate and an output rate, the data processor comprising a calibrator for calibrating the estimated bin level with reference to the particular reference level in response to the calibration indicator.

2. The system according to claim 1 wherein the status indicator further indicates a rotational velocity of a shaft or rotor associated with the conveyer.

3. The system according to claim 1 further comprising:
   a rotary driver for driving the conveyer, the rotary driver having a shaft or rotor;
   the output sensor detecting a rotational velocity of the shaft or the rotor;
   the data processor determining the output rate based on the status indicator and the rotational velocity.

4. The system according to claim 1 further comprising:
   an electric motor for driving the conveyer, the electric motor having a shaft or a rotor;
   the output sensor detecting a rotational velocity of the shaft or the rotor;
   the data processor determining the output rate based on the status indicator and the rotational velocity.

5. The system according to claim 1 wherein the input sensor comprises a mass flow sensor.

6. The system according to claim 1 wherein the conveyer comprises an unload auger.

7. The system according to claim 1 further comprising:
   an internal combustion engine for propelling a vehicle that carries the bin; and
   an electric motor for driving the conveyer at a rotational velocity independent of a rotational velocity of an internal combustion engine.

8. The system according to claim 1 wherein the output sensor is arranged to measure a time duration in which a rotary driver for driving the conveyer is in an active state or an inactive state.

9. The system according to claim 1 wherein the output sensor is arranged to measure a time duration in which an electric motor for driving the conveyer is in an active state or inactive state.

10. The system according to claim 1 wherein the output sensor is arranged to measure a rotational velocity of the rotary driver versus time, where the rotary driver is configured to drive the conveyer.

11. The system according to claim 1 wherein the output sensor is arranged to measure a rotational velocity of the electric motor versus time, where the electric motor is configured to drive the conveyer.

12. The system according to claim 1 wherein the level sensor comprises a switch that is activated or deactivated by a movable arm that is biased by a resilient member.

13. A method for monitoring a bin level for an agricultural product, the system comprising:
storing an agricultural product in a bin, the bin having an inlet and an outlet;
detecting a particular reference level of the agricultural product in the bin and generating a calibration indicator;
determining an input rate of the agricultural product into the inlet of the bin;
transporting the agricultural product through the outlet,
providing a status indicator that indicates whether the conveyer is in an active state or in an inactive state during one or more evaluation time windows; and
determining an output rate of the agricultural product based on the status indicator, estimating an estimated bin level of the bin based on the input rate and an output rate, and calibrating the estimated bin level with reference to the particular reference level in response to the calibration indicator.

14. The method according to claim 13 wherein the status indicator further indicates a rotational velocity of a shaft or a rotor associated with the conveyer.

15. The method according to claim 13 further comprising:
detecting a rotational velocity of a rotor or shaft associated with the conveyer, wherein the data processor is arranged to determine the output rate based on the status indicator and the rotational velocity.

16. The method according to claim 13 further comprising driving the conveyer at a rotational velocity independent of a rotational velocity of an internal combustion engine for propelling a vehicle that carries the bin.

17. The method according to claim 13 wherein the output sensor is arranged to measure a time duration in which a rotary driver for driving the conveyer is in an active state or an inactive state.

18. The method according to claim 13 wherein the output sensor is arranged to measure a time duration in which an electric motor for driving the conveyer is in an active state or inactive state.

19. The method according to claim 13 wherein the output sensor is arranged to measure a rotational velocity of the rotary driver versus time, where the rotary driver is configured to drive the conveyer.

20. The method according to claim 13 wherein the output sensor is arranged to measure a rotational velocity of the electric motor versus time, where the electric motor is configured to drive the conveyer.

21. The method according to claim 13 wherein the level sensor is activated or deactivated by a movable arm that is biased by a resilient member.

22. The method according to claim 13 wherein the calibrating adjusts the bin level each time upon a triggering of the level detector associated with a known bin level of the bin.

23. The method according to claim 13 wherein an adjustment adds or subtracts an adjustment volume to compensate for a measurement error or discrepancy in a determined bin level versus the known bin level capable of being indicated by the level sensor.

* * * * *